(12) United States Patent
Kucukcakar

(10) Patent No.: US 11,295,353 B2
(45) Date of Patent: Apr. 5, 2022

(54) COLLABORATIVE PEER REVIEW SEARCH SYSTEM AND METHOD OF USE

(71) Applicant: OpenNetReview, Inc., Mountain View, CA (US)

(72) Inventor: Kayhan Kucukcakar, Los Altos, CA (US)

(73) Assignee: Kayhan Kucukcakar, Los Altos, CA (US)

( * ) Notice: Subject to any disclaimer, the term of this patent is extended or adjusted under 35 U.S.C. 154(b) by 616 days.

(21) Appl. No.: 15/705,552

(22) Filed: Sep. 15, 2017

(65) Prior Publication Data
US 2018/0005281 A1    Jan. 4, 2018

Related U.S. Application Data

(63) Continuation-in-part of application No. 14/809,833, filed on Jul. 27, 2015, now Pat. No. 10,133,448.

(51) Int. Cl.
| | |
|---|---|
| G06Q 30/02 | (2012.01) |
| G06F 3/0482 | (2013.01) |
| G06F 16/248 | (2019.01) |
| G06F 16/9535 | (2019.01) |
| G06F 3/0484 | (2013.01) |
| G06Q 30/06 | (2012.01) |
| G06F 3/04842 | (2022.01) |

(52) U.S. Cl.
CPC ....... *G06Q 30/0282* (2013.01); *G06F 3/0482* (2013.01); *G06F 3/04842* (2013.01); *G06F 16/248* (2019.01); *G06F 16/9535* (2019.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 5,790,426 | A * | 8/1998 | Robinson | G06Q 10/025 702/179 |
| 8,478,651 | B1 * | 7/2013 | Crafts | G06Q 30/00 705/26.1 |
| 2010/0030638 | A1 * | 2/2010 | Davis, III | G06Q 30/0277 705/14.43 |
| 2012/0005113 | A1 * | 1/2012 | Kotis | G06Q 10/10 705/321 |

(Continued)

*Primary Examiner* — James Trujillo
*Assistant Examiner* — J Mitchell Curran
(74) *Attorney, Agent, or Firm* — Brad Bertoglio; Intelink Law Group, P.C.

(57) ABSTRACT

Techniques are disclosed for conducting poll-based reviews of various businesses and service providers and searching for the businesses and service providers having at least one review. A search module receives a search inquiry related to one or more reviewees having at least one review from one or more user devices. A filter module determines whether the one or more reviewees is associated with at least one search criteria in the search inquiry in order to identify reviewees that are associated with the received search criteria. Thereafter, the search module populates reviewees meeting the search criteria and displays the reviewees meeting the search criteria in a user interface. A trend analysis module performs a trend analysis for the reviewees meeting the search criteria.

20 Claims, 15 Drawing Sheets

(56) References Cited

U.S. PATENT DOCUMENTS

| | | | |
|---|---|---|---|
| 2012/0116905 A1* | 5/2012 | Futty | G06F 16/951 |
| | | | 705/26.1 |
| 2013/0262204 A1* | 10/2013 | Stiles | G06Q 30/0211 |
| | | | 705/14.13 |
| 2014/0304189 A1* | 10/2014 | Sullivan, IV | G06Q 30/0282 |
| | | | 705/347 |
| 2015/0334141 A1 | 11/2015 | Kucukcakar | |
| 2016/0042413 A1* | 2/2016 | Flood | G06Q 50/01 |
| | | | 705/319 |
| 2016/0366200 A1* | 12/2016 | Healy | H04L 65/60 |

* cited by examiner

FIG. 4

TITLE:

ADD NEW POLL QUESTION
* QUESTION | QUESTION |
* ANSWERS | ANSWER |

YOUR RESPONSE WAS SAVED SUCCESSFULLY!

| QUESTION | ANSWERS |
|---|---|
| QUESTION NO. 1 | A B C D |

ADD QUESTION TO POLL

192 — WELCOME BACK JOHN DOE
193 — YOU HAVE X MESSAGES
ANNOUNCEMENT
THERE IS A NEW REVIEW CATEGORY "CARS." GO TO CATEGORIES TO SEE.

194 — QUICK POLL: WOULD YOU ANSWER A COUPLE OF QUICK QUESITONS TO MAKE OUR CONTENT BETTER?
QUESTION ........................... YES | NO
QUESTION ........................... YES | NO
[SEND]

195 —
| ☐ FOLLOW | 1 MI | BRAZILIAN DUMPLINGS | DISCUSSION FORUM | WEBSITE | MAP | SOME CITY, CA | ☆☆☆☆☆ |
| ☐ FOLLOW | 1 MI | A DAY CARE | DISCUSSION FORUM | WEBSITE | MAP | SOME CITY, CA | ☆☆☆☆★ |
| ☐ FOLLOW | 3 MI | B DAY CARE | DISCUSSION FORUM | WEBSITE | MAP | SOME CITY, CA | ☆☆☆★★ |
| ☐ FOLLOW | 10 MI | C DAY CARE | DISCUSSION FORUM | WEBSITE | MAP | SOME CITY, CA | ★★★★★ |

FIG. 10

Advanced Search

1200

Category: City - Restaurant

Specification: Afghan, African, American, American, Armenian, Australian, Austrian, Bangladeshi, Barbeque, Bosque, Belgian, Brazilian, British, Burmese, Cajun, Cambodian, Chinese, Continental, Cuban, Czech, Ethiopian, Filipina, French, German, Greek, Hawaiian, Himalayan/Nepalese, Hungarian, Iberian, Indian, Indonesian, Irish, Italian, Japanese, Korean, Lebanese, Malaysian, Mexican, Mongolian, Moroccan, Pakistani, Persian/Iranian, Peruvian, Polish, Portuguese, Russian, Scandinavian, Scottish, Singaporean, Slovenian, Spanish, Sir Lankan, Taiwanese, Tex-Mex, Thai, Turkish, Ukrainian, Uzbek, Vietnamese

Classification: Casual, Fast Food, Fine Dining, Take Out

Keywords: Asian, Bakery, Barbeque, Breakfast, Brunch, Buffet, Burger, Coffee, Deli, Dinner, Fondue, Halal, Ice-cream, Kosher, Lunch, Middle-Eastern, Pastry, Pizza, Sandwich, Seafood, Steak, Sushi, Soup, Topas, Vegan, Vegetarian, Yogurt

Minimum Star Rating: ☆☆☆☆☆

Sort By: Best Fit       Distance: Within 5 miles

Review Questions:

| Question | Options |
|---|---|
| If you were in a small party, how was the service quality? | Will go somewhere else next time / A lot to improve / Just serving food / Enjoyable |
| How is the consistency of service over multiple visits? | Consistently not good / Very inconsistent / Somewhat consistent / Consistently good |
| How was the room temperature of the establishment? | Too hot/cold / Not comfortable / Comfortable |
| How was the bathroom stocked with basic supplies (toilet paper, soap, paper towel)? | Ran out basic supplies (toilet paper, soap, paper towel) / Well stocked with basics / Had extras like female hygiene products/lotion/perfume |
| Is the food quality consistent over multiple visits? | Consistently not good / Very inconsistent / Somewhat consistent / Consistently good |
| Seating arrangement for small parties (not self-seating)? | Wasn't seating available / Average seating / Given Options / Got the best seating available |
| How would you rate the suggested tipping policy? | Pushes for high tip / No suggestions |
| Does the establishment serve healthy food? | No / Some items claimed healthy choices / Yes |
| How clean were restrooms (s)? | No restrooms / Terrible – I choose not to use it / Spotless / Very dirty - Avoid it / Dirty - Use it if you have to / Clean |
| Does the establishment have convenient payment methods? | No - Cash only / Accepts cash and credit cards / Accepts credit cards and mobile payment |
| How was Wi-fi service? | No Wi-fi / Slow and not usable / Laborious to get password / Open / Open and fast |

FIG. 11

Buyer's Guide      1300
| Reviewer Filters |
|---|
| Gender    Female Male |
| Age Group  <18 18-25 26-30 31-40 41-50 51-60 61+ |
| Have Kids  None 0-5 6-11 12-17 |
⊖ 3Gs
⊖ Asian Box
⊖ Baja Fresh Mexican Grill
Analyze
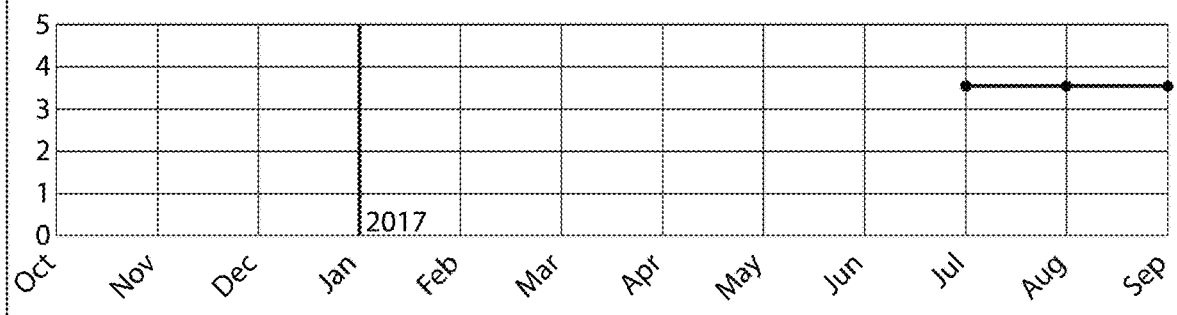
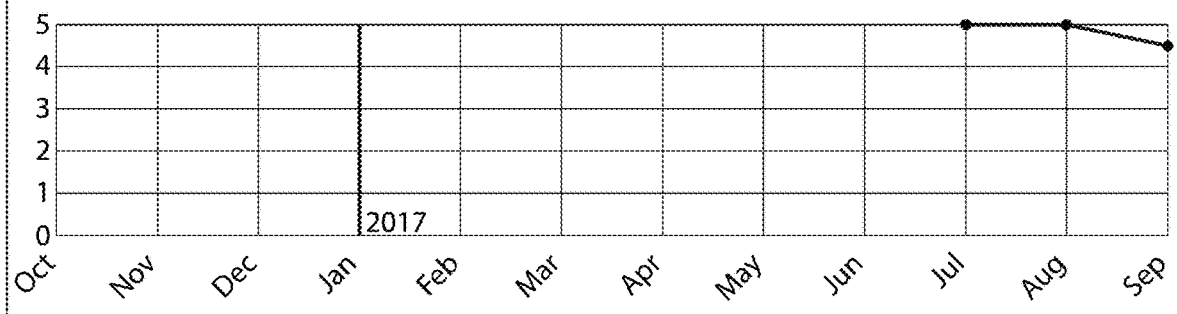
FIG. 12

COLLABORATIVE PEER REVIEW SEARCH SYSTEM AND METHOD OF USE

CROSS-REFERENCE TO RELATED APPLICATIONS

This application is the continuation-in-part of U.S. Non-provisional application Ser. No. 14/809,833, filed Jul. 27, 2015, which is hereby incorporated by reference in its entirety.

FIELD OF THE INVENTION

The present invention generally relates to a system and method for gathering and publishing reviews and ratings for suppliers of goods and services. More particularly, the present invention is directed to open-source polling that can display reviews in a tailored manner to show most relevant reviews to users.

BACKGROUND OF THE INVENTION

Various types of websites for posting reviews and conducting surveys exist in the prior art. For instance, some online shopping websites include consumer ratings and customer reviews for specific goods and products. Other websites include crowd-sourced reviews of local businesses for specific services. Generally, these reviews are based on a star system (e.g., five out of five stars, four out of five stars, etc.) or simply based on the number of consumers who approve of the goods or services (e.g., number of "likes").

However, the star ratings are too generic without many contexts associated therewith. Additionally, it is difficult to give meaningful weight to these reviews with a consistent scale because one reviewer's three-star rating may be equivalent to another reviewer's five-star rating. While some reviews are coupled with comments or textual feedback for providing support to said rating, these comments are often unstructured and time-consuming to read and write. Furthermore, the textual feedback is lost or made less visible when more recent feedback is posted. In this regard, there is a need in the prior art for a collaborative review system that provides users with consistent and accurate information and that prioritizes most relevant reviews about goods and services. In this regard, the invention described herein addresses these problems.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

In one embodiment, the present invention comprises a plurality of electronic devices, each of the devices having a processor, storage units, and a communication module for connecting to the Internet. The devices are in communication with at least one server over a network such as the Internet. The server comprises a processing means and one or more database. The method includes operating the devices to create, upload, monitor, access, and/or provide reviews on a website for goods/services provided by retailers, restaurants, professional service providers, and the like. The present invention allows the users to provide reviews by answering poll-based review questions, wherein the poll-based review questions are ranked by the user in order of importance, popularity, or relevance, among other factors. The users can also add review questions to be answered by other users to provide most relevant feedback. The results from the review questions are then used to rank or rate the merchant or the service provider reviewed.

The website also takes polls to gather information about the users. Without limitation, the information gathered from the polls may comprise demographic information and information about the user's preferences. The results from the polls are used to provide tailored suggestions for merchants or professional service providers to the user. In addition, the present invention is directed not only to a website operated by a host computer or a server but also to an application contained in a computer-readable medium containing instructions for the host computer or the server to perform the aforesaid functions.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which:

FIG. 4 shows an exemplary user interface for entering polls.

FIG. 5 depicts an exemplary user interface for entering new poll questions.

FIG. 6 shows an exemplary user interface for base category definition.

FIG. 7 shows an exemplary user interface for entering poll-based reviews and entering review ranking.

FIG. 10 shows another exemplary user interface for providing general suggestions based on reviewer preferences.

FIG. 11 shows an exemplary user interface for conducting an advanced search.

FIG. 12 shows an exemplary user interface for displaying trend analysis on a buyer's guide.

DETAILED DESCRIPTION OF THE INVENTION

The present invention is directed towards a collaborative review system. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form. Furthermore, terms "customer" and "user" are used interchangeably, unless the context clearly indicates otherwise. It is to be appreciated that determinations or inferences referenced throughout the subject specification can be practiced through the use of artificial intelligence techniques.

Example Architecture

Figure 1:
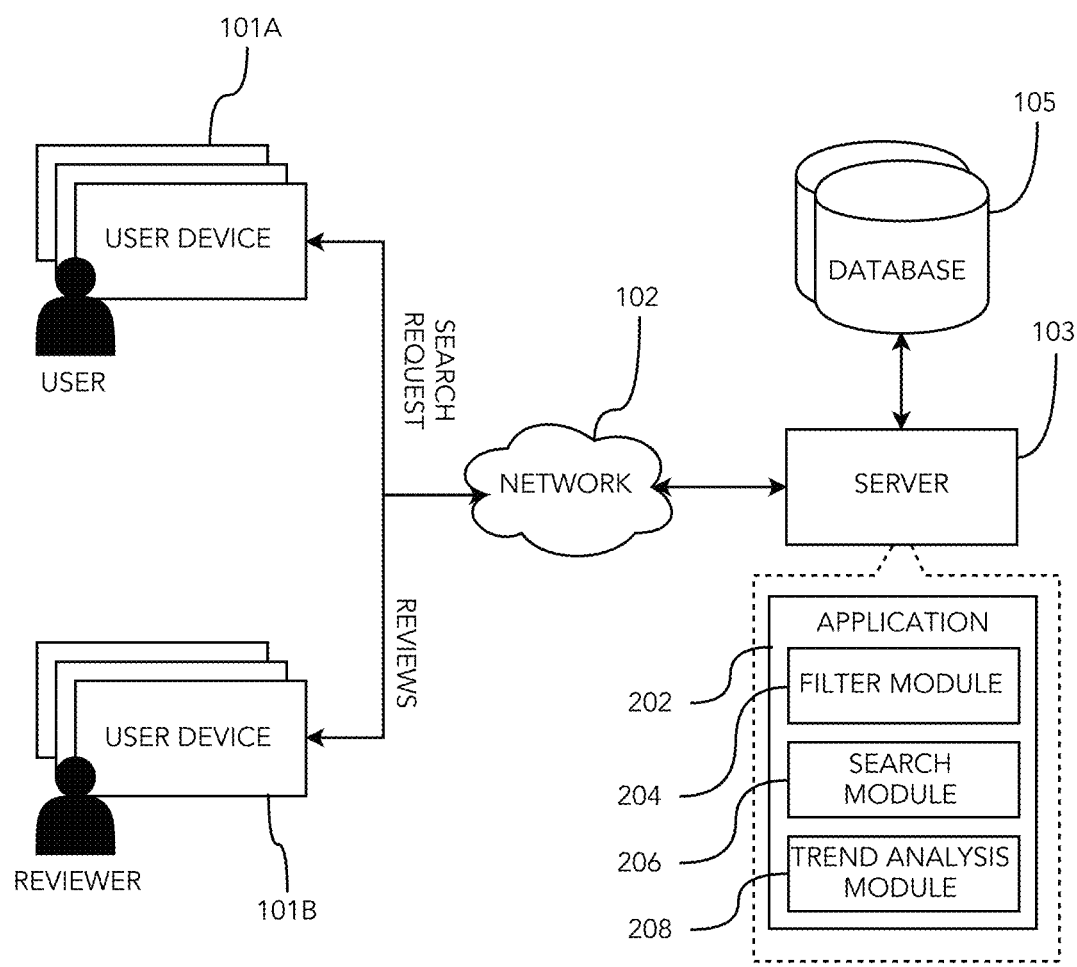
FIG. 1 depicts an example architecture for implementing the computer system according to one embodiment of the present invention.

Referring now to FIG. 1, there is shown an example architecture of an exemplary embodiment of the present system. The system 100 comprises one or more data enabled devices 101A, 101B having network access capabilities such as computers, tablet computers, mobile phones, personal digital assistants (PDAs), portable media players, and/or so forth. The devices 101 are used by reviewees, reviewers, or other users to access, create, upload, and/or search for reviews via a website, an application 202 (e.g., a mobile application, a web application, etc.) from the front end of the system. As used herein, "reviewee" or "reviewees" are a person or an entity such as a merchant or a restaurant that provides goods and/or professional services and that is being reviewed. As used herein, "reviewer" or "reviewers" are a person, preferably a consumer, a customer, or a user who reviews or provides feedback to the reviewee. It is contemplated that each of the reviewees and the reviewers is prompted to register for an account via the website, web application, or the mobile application.

The application 202 may execute on one or more servers 103 at the back end of the system 100, wherein the one or more servers 103 or computing nodes are in communication with each of the devices 101A, 101B in the network 102 (e.g., the Internet, LAN, etc.). The servers 103 may be distributed processing nodes that are scalable according to workload demand. In various embodiments, the servers 103 may include general purpose computers, such as desktop computers, tablet computers, laptop computers, servers, and so forth. However, in other embodiments, the servers 103 may be in the form of virtual machines, such as virtual engines (VE) and virtual private servers (VPS). The servers 103 may store data in a distributed storage system, in which data may be stored for long periods of time and replicated to guarantee reliability. Accordingly, the servers 103 may provide data and processing redundancy, in which data processing and data storage may be scaled in response to demand. In various embodiments, however, the system 100 further comprises one or more dedicated databases 105 for storing data and retrieving requested information from the server 103, wherein the databases 105 can also comprise servers or computing nodes. For example, a reviewer can submit a review from his or her user device 101B, and the server 103 can store the review in its database 105. In another example, a user can submit a search request for a review, and the server 103 can retrieve relevant search results from the database 105. Further, in a networked deployment, new servers 103 may be added on the fly without affecting the operational integrity of the application 202.

In various embodiments, the application 202 includes a filter module 204, a search module 206, and a trend analysis module 208. The application 202 provides a user interface for providing poll-based reviews and conducting searches for reviews based on filtering or other refinement methods. In various embodiments, reviewers can provide review answers to review questions and/or add new review questions, wherein the review answers and/or review questions can be rated on a scale (e.g., star rating). Alternatively, reviewers can provide review answers that are not rated on a scale. The review answers can comprise multiple choice answers, multiple answer selections (e.g., check boxes), short answers, and/or so forth. The search module 206 allows a user to submit a search inquiry or submit search requests for reviewees and/or reviewers.

Upon receiving a search inquiry from the search module 206, the filter module 204 can use machine-learning based algorithms to filter search results for reviews based at least partially on a user's search inquiry. For instance, a search inquiry can include a specific search string such as a reviewee's name. In another example, the filter module 204 can search for one or more reviewees having four-star reviews and above as specified in the search inquiry. Additionally, the filter module 204 can search for one or more reviewees having specific review answers for review questions. More specifically, the filter module 204 can search for one or more reviewees having certain keywords in review answers as specified in the search inquiry. For example, a user can search for medical providers (i.e., reviewees) who are female (i.e., keyword). In another example, the filter module 204 can search for one or more reviewees having one or more selected answer choices specified in the search inquiry.

In various embodiments, the filter module 204 can provide filtering based on reviewee attributes. Reviewee attributes can comprise categories (e.g., restaurants), subcategories (e.g., fine-dining), classification (e.g., American), keywords (e.g., sandwich), and/or so forth. In this regard, the application 202 can provide a menu of reviewee attributes. Based on selected reviewee attributes, the filter module can identify reviewees having selected reviewee attributes. The filter module 204 can also provide filtering based on the minimum rating on a scale. More specifically, the filter module 204 can provide filtering based on a minimum star rating of a reviewee. For example, the filter module 204 can identify restaurants having a four-star rating or higher.

Additionally, the filter module 204 can provide filtering based on review question star rating criteria. In this regard, a user can use the review questions available for a reviewee to filter results. For example, a user can select and/or enter an answer for a given review question for a reviewee or a category. The filter module 204 then calculates a star rating for the given review question based on the user's answer. Said another way, the user's answer is converted to a star rating, for example, by comparing the user's answer to other answers provided by other reviewers for the same review question. Based on the converted star rating, the filter module 204 identifies reviewees associated with review questions having star rating greater than the converted star rating.

The filter module 204 can also provide filtering based on answer selection popularity criteria. More specifically, a user can answer one or more review questions available for a reviewee. The filter module 204 then filters results for reviewees by identifying reviewees having one or more review questions with review answers that were answered the same or similar to the user's answers more than a predetermined number of times. For example, a user can provide Answer A for Question 1 that relates to one or more reviewees. The filter module 204 identifies reviewees from the one or more reviewees that received Answer A for Question 1 more than a predetermined number of times (e.g., more than 50% of the times the question was answered by reviewers).

The filter module 204 can also provide filtering based on reviewer attribute criteria. In this regard, a user can select one or more reviewer attributes, wherein the reviewer attributes can comprise a reviewer's gender, location, marital status, age group, family size, and/or so forth. For example, the filter module 204 can identify reviewees having reviews that were submitted by reviewers having selected reviewer attributes. In this way, a user can analyze reviews that were provided by reviewers having similar social and demographic characteristics, as these reviews can be more relevant to the user.

The filter module 204 can also provide filtering based on timeline criteria. In this regard, a user can specify a date range or specific dates on which a review was submitted. Based on the specified date range or dates, the filter module 204 can identify reviewees having reviews that were submitted during the specified date range or dates.

The search module 206 can receive a search inquiry on a user interface 1200 as depicted in FIG. 11. The search module 206 can further populate search results to deliver to the user, for example, on the user interface. In some embodiments, the user interface comprises a graphical user interface (GUI) that includes a buyer's guide. The buyer's guide comprises a list of reviewees. In various embodiments, the buyer's guide comprises an image, a link to follow, reviewee's community, a reviewee's company, higher-level category, reviewee's star rating, distance, location, link to a discussion forum, website, and/or phone number associated with each reviewee in the list. Additionally, the buyer's guide comprises a link to add one or more reviewees to a virtual shopping cart, for example, to compare reviewees and to purchase goods and/or services offered by the one or more reviewees. In various embodiments, users can complete an online transaction to purchase the goods and/or services directly from the user interface. Alternatively, the user can be directed to a third-party application (e.g., a payment portal) or a website such as a reviewee's website in order to purchase the goods and/or services from the reviewee.

The trend analysis module 208 is configured to provide trend analysis for each reviewee as shown in FIG. 12, for example, on a user interface of a buyer's guide. Particularly, the trend analysis module 208 can provide trend analysis for each reviewee that is included in the buyer's guide or in the search results. In this regard, a user can select a reviewee in the buyer's guide to view more detailed information about the reviewee and view trend analysis that is associated with the selected reviewee. Two or more reviewees in the buyer's guide can be selected so as to allow the user to directly compare trend analysis for multiple reviewees concurrently. In various embodiments, the trend analysis module 208 generates a graph. The graph can depict summary rating of review questions over a given period of time. In this way, users can see how one or more desired attributes of a reviewee or multiple reviewees vary over time. Thus, a user is able to compare the correlation between two or more desired attributes. For instance, a user can view how food pricing, quality of food, and/or quality of service at a restaurant vary over time, and a correlation between increased food pricing and decreased quality of food over time would allow the user to avoid going to the restaurant. In various embodiments, the graph can be customized to display trend analysis according to user preferences. For example, the graph can be customized to display trend analysis based on a user's customized review summary rating or a reviewee's overall summary rating.

Example Computing Device Components

Figure 2:
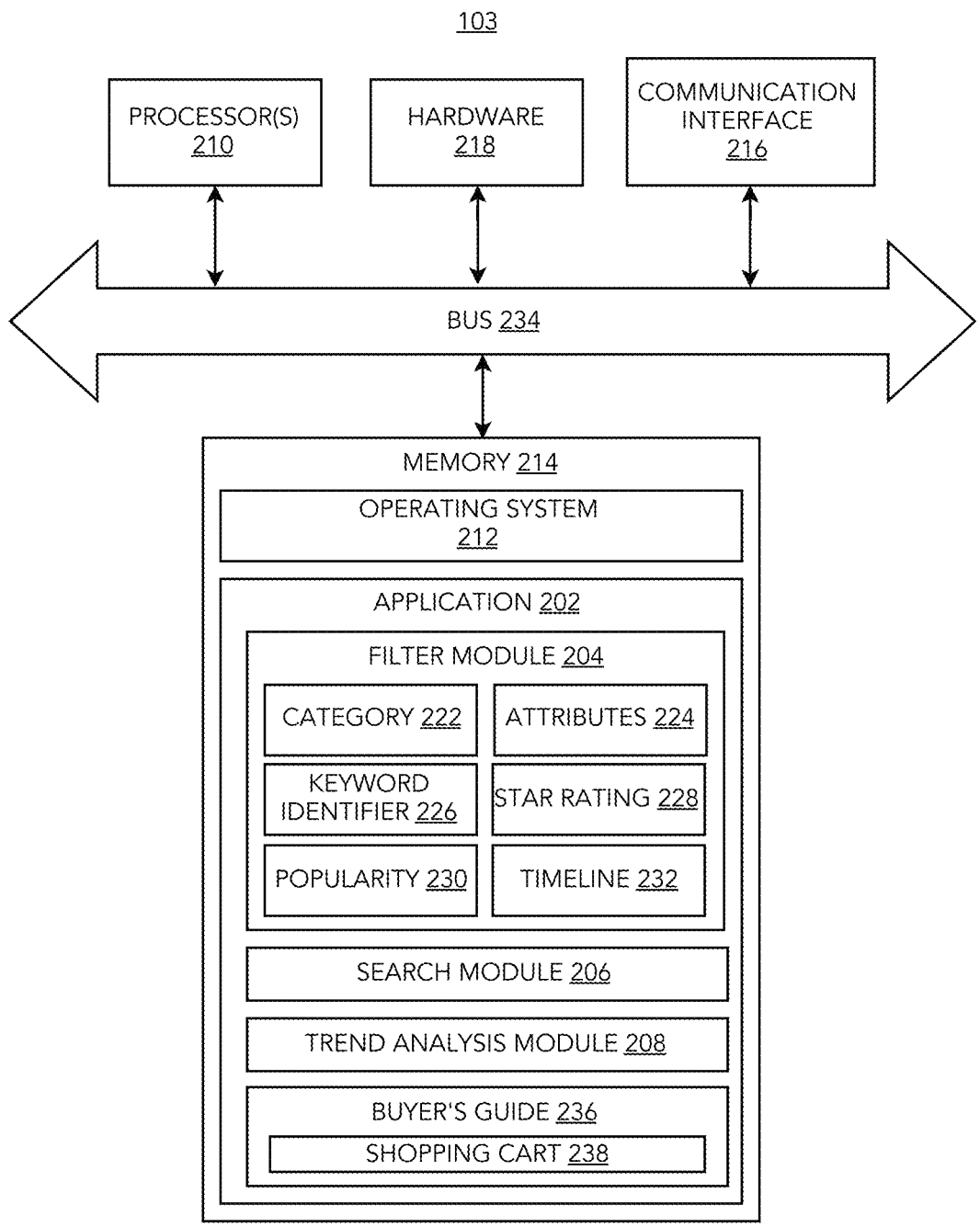
FIG. 2 is a block diagram showing various components of the application for providing collaborative peer reviews and search filtering for reviews.

Referring now to FIG. 2, there is shown various components of the application that performs poll-based reviews and search refinement. The application 202, including the filter module 204, the search module 206, the trend analysis module 208, and the buyer's guide 236, may be implemented by one or more computing nodes 103 (i.e., a server) of a distributed processing computing infrastructure. The number of computing nodes 103 may be scaled up and down by a distributed processing control algorithm based on the data processing demands of the application 202. The computing nodes 103 may include a communication interface 216, one or more processors 210, and memory 214. The communication interface 216 may include wireless and/or wired communication components that enable the one or more computing nodes 103 to transmit data to and receive data from other networked devices. The computing nodes 103 may be accessed via hardware 218. The hardware 218 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 214 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism. The processors 210, hardware 218, communication interface 216, and the memory 214 are operatively connected via a bus 234.

The application 202 comprises the filter module 204, the search module 206, and the trend analysis module 208. In various embodiments, the application 202 further comprises a buyer's guide 236 for providing guidance to users for selecting products and/or services from one or more reviewees. As described in FIG. 1, the search module 206 receives search inquiry from a user via a user device, and the filter module 204, upon receiving the search inquiry, filters search results for reviewees having reviews that match one or more search criteria specified in the search inquiry. Without limitation, the search criteria comprise category 222, attributes 224 (i.e., reviewee attributes and reviewer attributes), key words identified via a keyword identifier 226, star rating 228 (i.e., review question star rating, review summary rating, overall summary rating, etc.), answer selection popularity 230, timeline 232, and/or so forth.

The search module 206 is further configured to populate search results that meet the one or more search criteria to display on the user device. In some embodiments, the search module 206 generates a buyer's guide 236 that comprises the search results. The search results can comprise a list of reviewees having reviews that match the one or more search criteria. In various embodiments, the buyer's guide comprises a virtual shopping cart 238. For example, a user can select one or more reviewees to add to the shopping cart 238. Upon adding the one or more reviewees to the shopping cart 238, the user can view the shopping cart 238 in order to view the list of selected reviewees. In various embodiments, the user can purchase goods and/or services offered by the one or more reviewees upon checking out from the shopping cart 238. In this regard, the shopping cart can be operatively connected to a payment portal or a website such as a reviewee's website to complete the purchase of the goods and/or services from the reviewee.

Example User Interfaces

Figure 3:
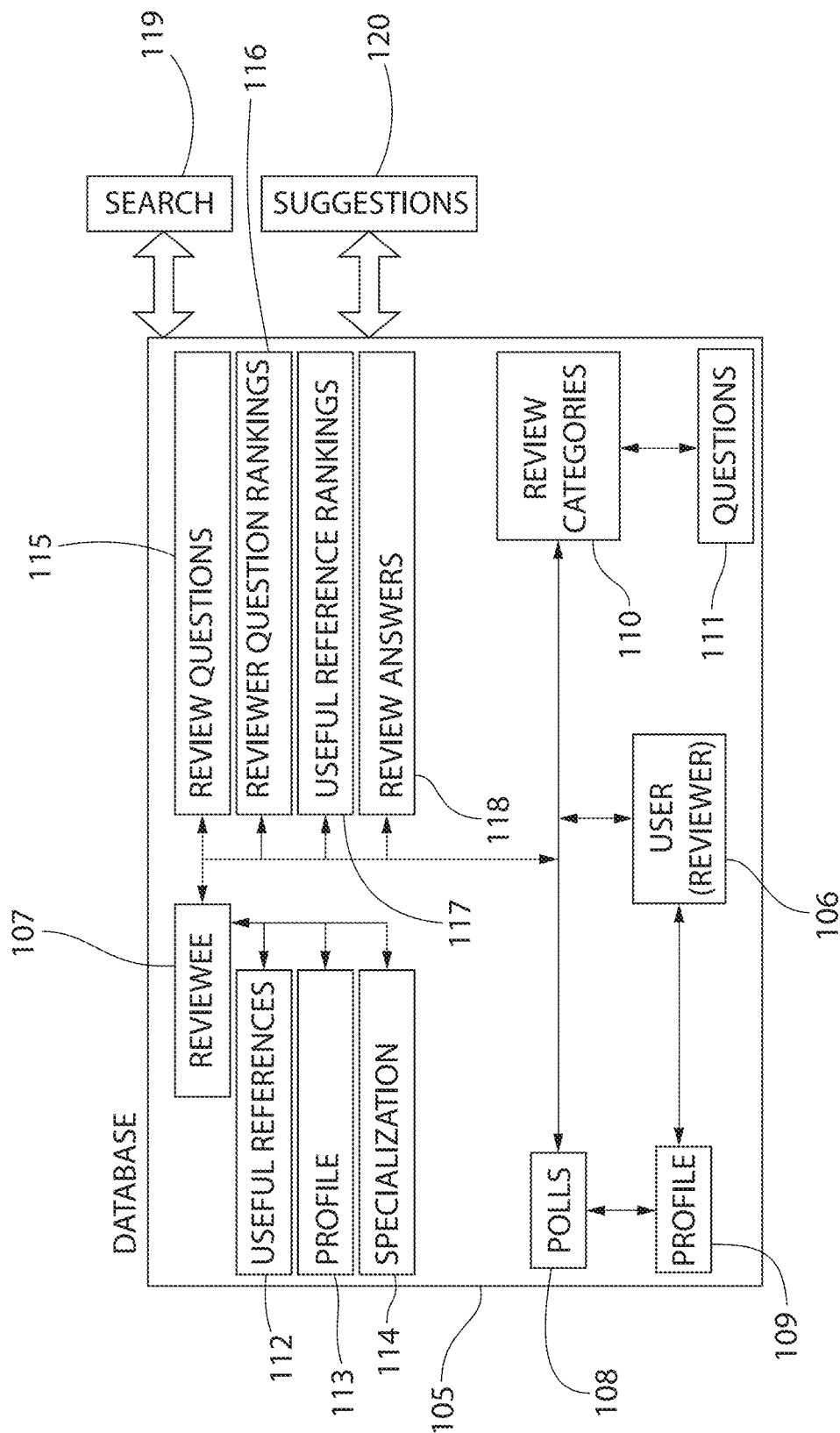
FIG. 3 depicts an exemplary block diagram illustrating the inner workings of a database of the present invention.

Referring now to FIG. 3, there is shown a block diagram illustrating the inner workings of the database 105 of the present invention. The database 105 retrieves and stores information associated with search queries 119 and search suggestions 120. In the illustrated embodiment, the database 105 comprises at least two sets of data: the first set for a reviewee 107; and the second set for the reviewer 106. The first set of data includes profile information 113 for each of the reviewees 107. Without limitation, the profile information 113 may comprise the reviewee's name, contact information, hours of operation, types of goods and/or services that the reviewee 107 provides, and/or so forth. In various embodiments, the database 105 categorizes each reviewee by specialization 114 or industry so that information associated with the reviewees 107 is stored in an organized manner. For example, categories comprise restaurant, school, and/or so forth.

The first set of data further comprises review questions 115, review answers 118 corresponding to each review question 115, reviewer question rankings 116, useful references 112, and useful reference rankings 117 associated with each of the reviewees 107 in the system. The review questions 115 and answers 118 pertain to feedback for goods and/or services provided by the reviewee 107. The reviewer question rankings 116 pertain to how each review question was ranked by the reviewers 106. The useful references 112 comprise references such as third-party websites pertaining to the product and/or service area of the reviewee 107. The useful reference rankings 117 pertain to how each useful reference was ranked by the reviewers 106. For example, useful references 112 that provide more pertinent information about the reviewee 107 can be ranked higher than useful references 112 that provide less pertinent information about the reviewee 107.

The second set of data includes profile information 109 for each of the reviewers 106 with a registered account in the system. In one embodiment, each account corresponds to profile information 106 comprising reviewer profile abstracted information, poll profile, and review profile. In this regard, the profile information 106 encompasses the reviewer's preferences and other unique information pertaining to a reviewer. Without limitation, the reviewer profile abstracted information includes demographic information such as the reviewer's name, contact information, and/or so forth. The poll profile comprises information about each of the reviewers derived from polls 108. Without limitation, the polls profile may include information about the reviewer's opinions, preferences, household income, and/or so forth.

Additionally, the review profile is based on the reviews provided by the reviewer. The review profile may be organized and/or broken down by each review category used in the reviews, each classification, and/or each question. Each review category comprises one or more classification related to the review category and each classification comprises one or more questions related to the classification. Thus, each review category 110 comprises questions 111 associated with the review category 110. For example, the category may comprise a restaurant, the classification may comprise a fast food restaurant, and the question may comprise the cost of food at the fast food restaurant.

Information from the database 105 is used to generate review summary rating. More specifically, each reviewer answer for each review question 115 is given a star rating based on the desirability, relevance, and/or importance of the answer. In this regard, the most desired, relevant, and/or important answers are ranked the highest (i.e., with the most number of stars) and the least desired, relevant, and/or important questions are ranked the lowest (i.e., with the lowest number of stars). The star rating given for each answer is averaged. For example, a reviewer answer can be given five-stars by a first user and three-stars by a second user. Thus, the reviewer answer has a four-star rating. The reviewee's overall summary rating is the average of the star ratings of each poll-based question answered by the reviewers. Because each reviewer is able to add review questions, not every review has the same set of questions and answers and not every reviewer answers the same set of questions and answers.

Figure 4:
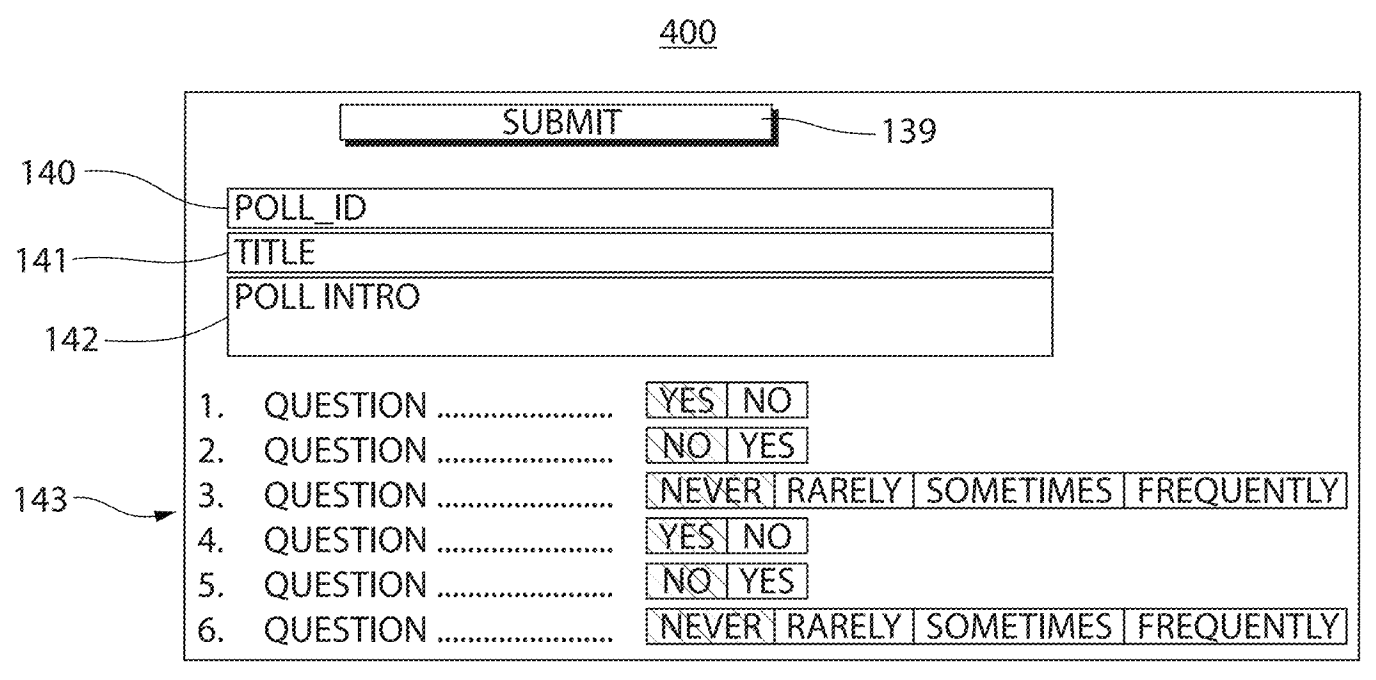

FIGS. 4 and 5 show exemplary user interfaces 400, 900 for filling out polls and for entering new questions for open-source polls. In one embodiment, the GUI for filling out polls with a data enabled devices includes a poll identification name or number 140; a poll title 141; and introduction or a brief description 142 of the poll. The reviewers can answer questions 143 by selecting an appropriate answer choice and submitting the answers via a submit button 139. In the illustrated embodiment, the response choices comprise a "yes" or a "no" type of a response or a multiple-choice with answers such as "never," "rarely," "sometimes," or "frequently" or other preset answers. In another embodiment, the response choices may comprise a free-form text field so as to allow reviewers to enter short answers therein.

To add one or more poll questions to an existing poll, the reviewers can enter a title of the poll 199 to which the reviewer wants to add new questions; and add new poll questions 200 by entering a question and answer choices. Alternatively, the reviewer can leave a free-form text field for allowing other reviewers to enter short answers instead of selecting one or more of given answers in a list. It is contemplated that the new poll questions are questions asked in addition to the initial profile questions to complete the reviewer's account and further define the reviewer's preferences. Once a new question is added, the reviewers can activate an "add question to poll" button to save the question, so that the question is added to the poll and made accessible and/or visible to other reviewers.

Figure 6:
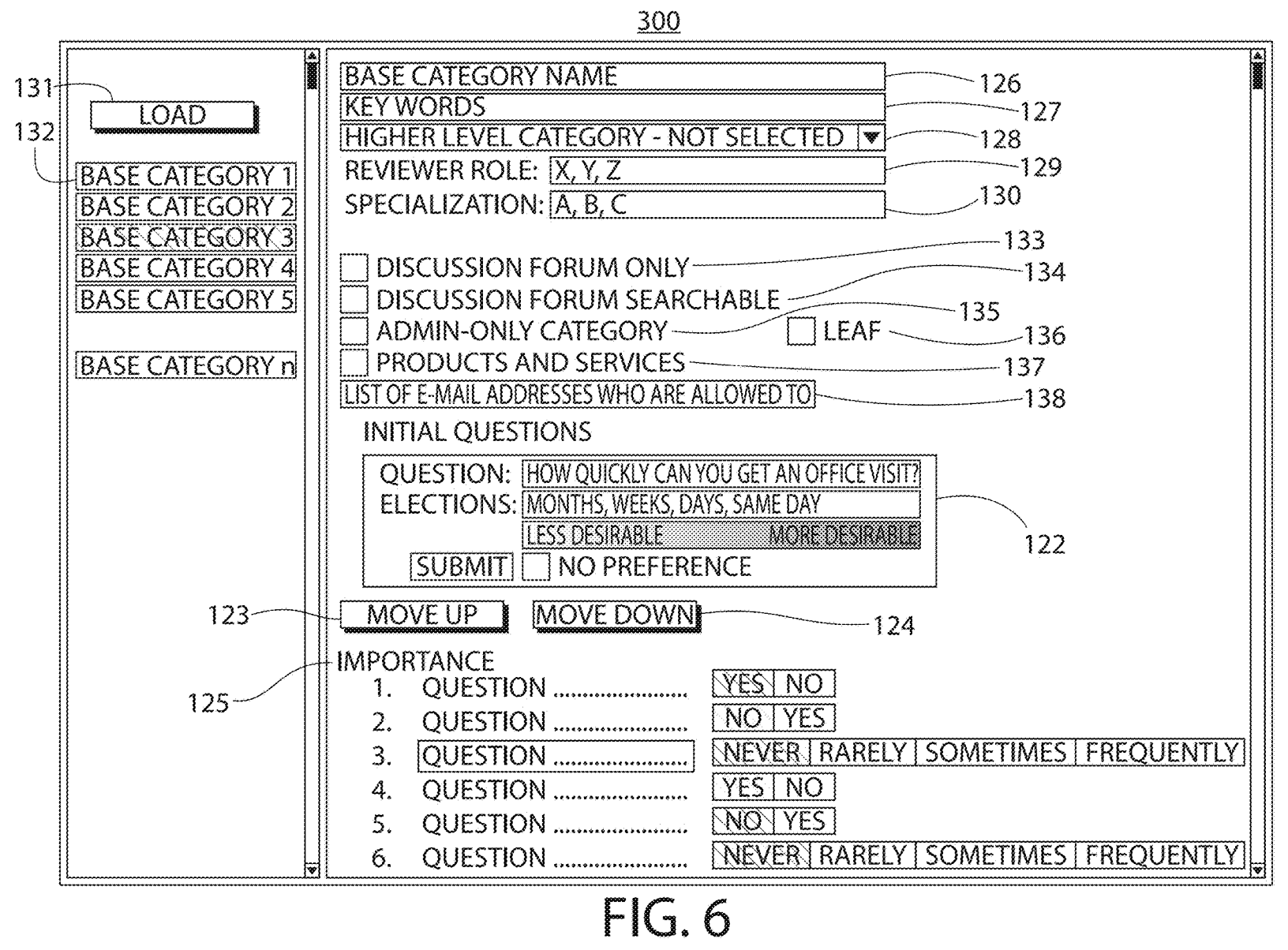

Referring now to FIG. 6, there is shown an exemplary user interface 300 for base category definition. A method for entering a base category definition includes the steps of entering a base category name 126 (e.g., a restaurant, school, medical providers or doctors), entering key words 127, selecting a higher-level category 128 (e.g., a hospital), and specifying reviewer roles 129. In the illustrated embodiment, the reviewer roles 129 may be manually entered. Alternatively, it is contemplated that the roles for some or all of the reviewees may be automatically populated based on several factors. Without limitation, the factors comprise the base category name 126, the key words 127 entered, the higher-level category selected 128, the type of goods and/or services that the reviewee provides, the type of business, the type of industry, and marketing channels, among others.

Figure 7:
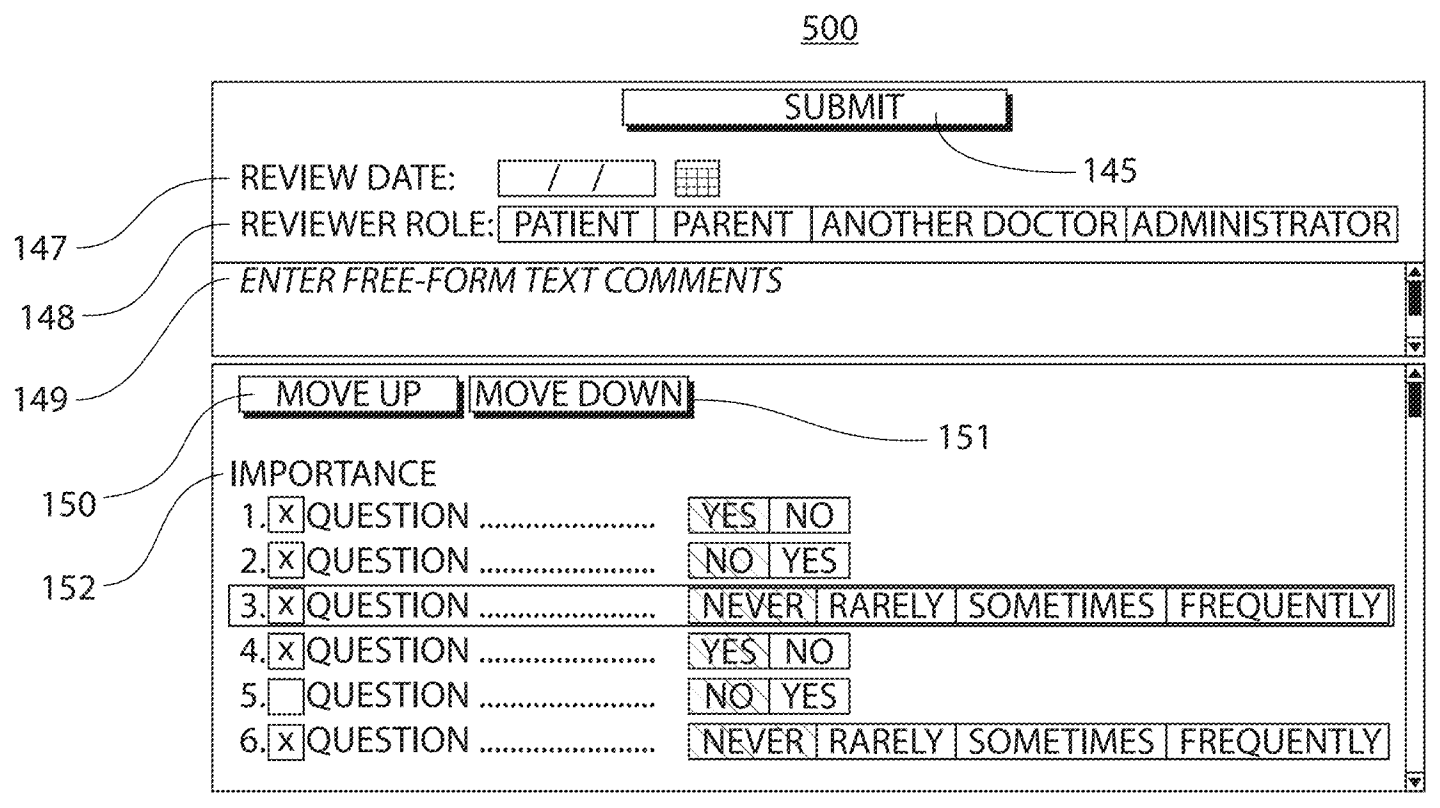

In this regard, if a reviewee is a doctor, the reviewer role may be a patient, a parent, another doctor, or an administrator, as depicted in FIG. 7. Similarly, if the reviewee is a tutor, the user interface provides the choices of a student, a parent, a teacher, or the like for the reviewer. Alternatively, the reviewer roles may be manually inputted by the reviewer who is completing the review.

The technique for entering base category definition further includes controlling the accessibility of the base category. This can be accomplished by specifying whether the base category should be available as a discussion forum only 133, discussion forum searchable 134, admin-only category 135, leaf 136, and/or products and services 137. Additionally, identifying information such as the email addresses of individuals who are allowed to access the base category 138 can be entered.

Thereafter, initial poll-based review questions 122 can be submitted by entering questions and answers or elections. The answers or elections can be provided or selected in a form of a short response or designated on a scale. Additionally, the answers can be tagged with a desirability scale to indicate increasing desirability of the question. It is contemplated that more desirable the question, the higher it is rated via a star rating system. After a question is added, it can be moved up or moved down so that it is reordered on a list of questions 125 via a move up button 123 or a move down button 124, respectively. In this way, the questions can be displayed in a ranking order that is unique to each reviewer.

Once the base category is complete, it can be loaded to the list of base categories 132 when a load button 131 is activated.

FIG. 7 shows an exemplary user interface 500 for entering poll-based reviews and entering review ranking. The technique for entering poll-based reviews may comprise the steps of entering a review date 147 and a reviewer role 148. In the illustrated embodiment, the reviewer can enter his or her role by selecting one of the choices provided, for example, in a menu. Thereafter, the reviewer can input opinions or comments in a free-form text field 149. In addition to providing an opinion or a comment, the reviewer can answer poll-based questions provided on the user interface 500 by selecting an answer associated with each question.

The order of the poll-based review questions 152 may be altered based on the order of importance. In order to change the order of the questions 152, the reviewer can select a question that he or she wishes to reorder. The reviewer can activate the "move up" button 150 to move the question towards the top or the "move down" button 151 to move the question towards the bottom. This process is repeated until the questions are listed in the order to the reviewer's liking. In this way, the user can assign a ranking to each question or sort each question based on the question's importance to the user. Once the reviewer has completed the review, he or she can activate the submit button 145 to submit the review.

Figure 8:
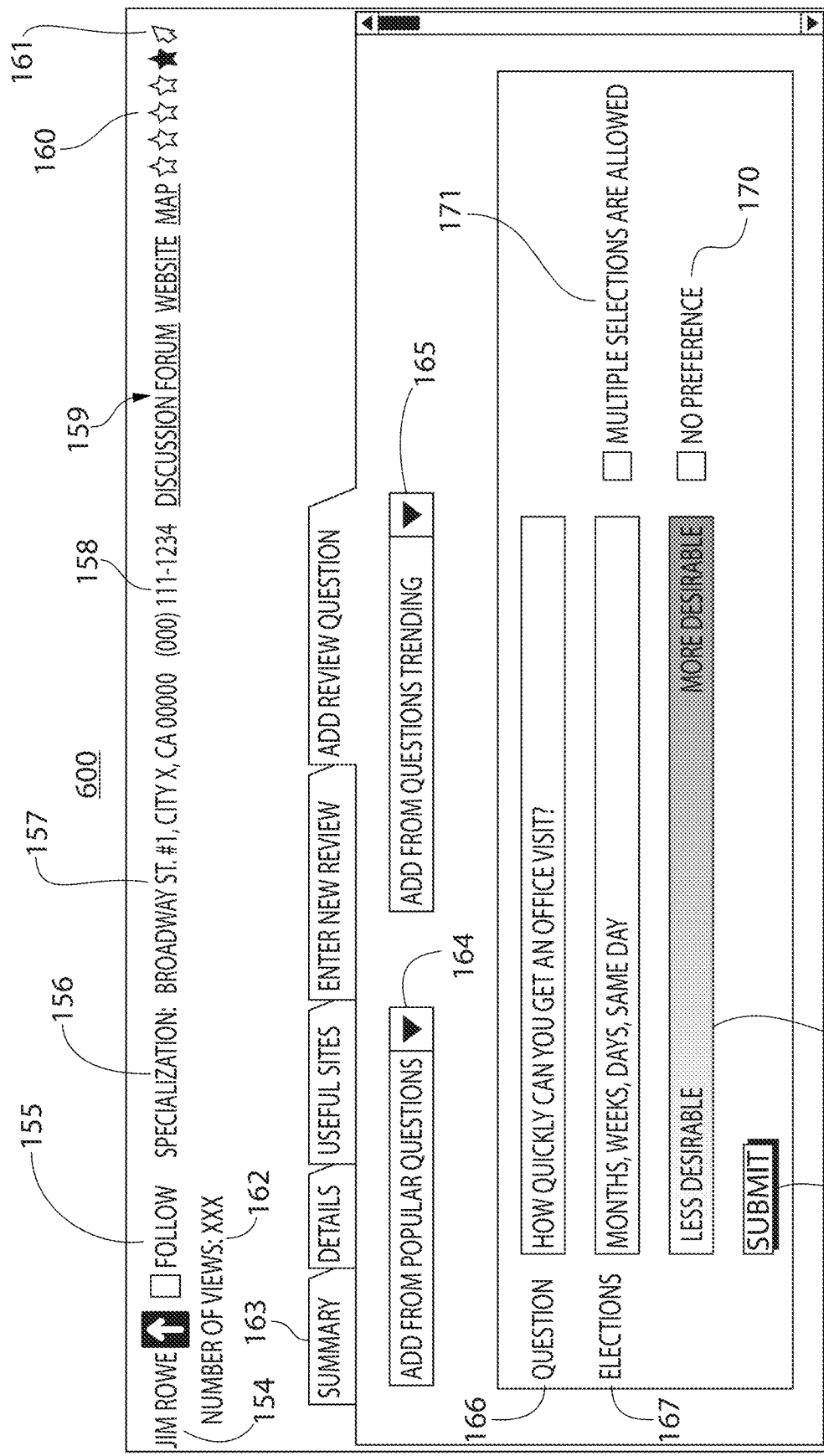
FIG. 8 depicts an exemplary user interface for entering new poll-based review questions.

Referring now to FIG. 8, there is shown an exemplary user interface 600 for entering new poll-based review questions. The user interface 600 includes the reviewee's information, such as the reviewee's name 154, a link to follow or subscribe to 155 the reviewee, specialization, address, phone number, link to additional information about the reviewee 159 such as a third-party website, a discussion forum, a map, or the like. Additionally, the reviewee's review information is summarized as a star rating 160 and rating trend 161, which is shown as an indicator arrow. The indicator arrow can point upward to show that the star rating 160 has increased or point downward to show that the star rating 160 has decreased. In some embodiments, the number of views 162 of the user interface 600 may also be shown.

The GUI of the user interface 600 further comprises a plurality of sub tab menus 163, wherein one of the sub tabs is for adding review questions. In this way, the present invention provides open-source polling and can capture most relevant feedback from each reviewer. Under the tab for adding review questions, the reviewer is initially given the option of adding a question from a list of popular questions 164 asked by other reviewers and/or adding a question from a list of trending questions 165. It is contemplated that the popular questions 164 are the questions that are ranked as one of the most important or desirable questions by the most number of reviewers. Additionally, it is contemplated that the trending questions 165 are the questions that move from the bottom of the list to the top of the list at the fastest rate in a given amount of time. In the illustrated embodiment, the option of adding a popular question or a trending question is provided via drop down menus.

Alternatively, the reviewer can add his or her own question 166 and answer choices 167. If the question is a multiple-choice question, the reviewer can select whether multiple answer selections 171 are allowed. Depending on the type of the question asked, the reviewer could indicate a desirability scale 168 for answers. If the answer to the question is more desirable, the answer is given the maximum number of stars. On the contrary, if the answer to the question is less desirable, the answer is given the minimum number of stars. If the scale is not applicable, the reviewer can select an option 170 for omitting to answer on the scale. When the reviewer activates a submit button 169, the question is saved and made available to other reviewers to answer.

Once a review is completed, it is summarized such that the best ranking questions or questions with the most popular questions are positioned at the top of the list. It is preferred that all questions pertaining to a reviewee are listed so as to allow the reviewer to access all of the poll-based review questions. The method of computing a review summary rating of each question for each reviewer comprises the steps of determining a reviewer answer for each question, computing a star rating for each reviewer answer based on the desirability, relevance, importance, and/or similar factors, and calculating the average of star rating for each reviewer answer to the question. The least desirable reviewer answer is given zero stars or a minimum number of stars, and the most desirable reviewer answer is given five stars or a maximum number of stars. For example, the most desirable answer may be given five-star ratings, and the least desirable answer may be given zero star ratings. The reviewee's overall summary rating is then computed by averaging the star ratings of each question answered by the reviewers.

Review summary rating can be uniquely customized for each reviewer so that the review summary rating substantially reflects the reviewer's profile and preferences. This customized review summary rating method is accomplished by taking into account only the reviews that are the most relevant and important to the reviewer. Additionally, a correlation factor is computed between the reviewer and other reviewers. If the correlation is above a predetermined threshold, the review is used in the computation of review summary rating. The correlation is computed by computing how similar the reviewer and another reviewer are in terms of their profiles, answers to polls, and rankings of poll-based review questions.

Figure 9:
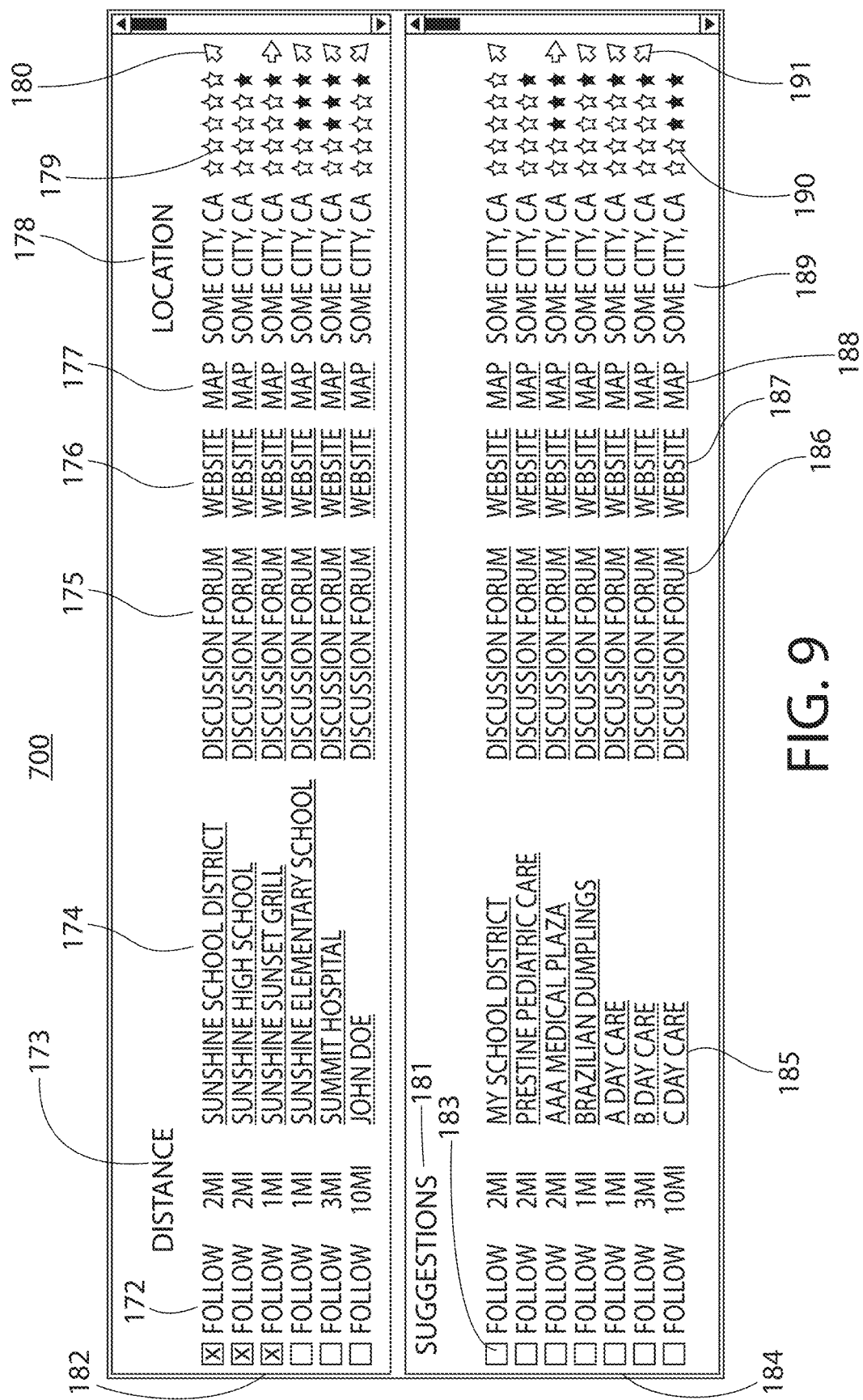
FIG. 9 shows an exemplary user interface for suggesting various vendors and service providers based on reviewer preferences.

Referring now to FIG. 9, there is shown an exemplary user interface 700 for displaying search results for merchants and service providers (i.e., reviewees), and suggestions related to user-requested search. The reviewee information may be shown such that the user interface 700 comprises a first section 182 for displaying the reviewees 174 that are matching the search query input by a user; and a second section 184 for displaying suggested reviewees 185 not perfectly matching the user's specific search but still relevant to the user's search and user's profile.

A marker, such as an upward arrow 180 or a downward arrow 191, may indicate any changes in each reviewee's overall summary rating 179, 190. If there are no changes, no markers are used. Similarly, if the change is negligible and/or the change in rating does not exceed the predetermined threshold, no change is indicated. In addition to the star rating 179, 190, the GUI shows other information such as a link to follow or subscribe to 172 the reviewee; the distance 173 between the reviewee and the reviewer's location; a link to the reviewee's discussion forum 175, 186; a link to the reviewee's website 176, 187; and a link to a map 177, 188 for navigation.

The search is based on a non-fixed weighing mechanism using the data from the reviewer's profile and poll questions. The non-fixed weighing mechanism assigns a predetermined number of points for each topic in the reviewer's profile or for each topic related to a poll question. For example, the weighing mechanism assigns ten points for a topic such as a zip code. If a reviewee's zip code matches the reviewer's zip code, then a reviewee is allocated all ten points. Alternatively, if the reviewee's zip code is located beyond a predetermined distance from the reviewer's zip code, then the reviewee is allocated zero points or less than ten points.

In another instance, the weighing mechanism assigns three points for a household with children between the ages of six to twelve. If a reviewee provides products and/or services relevant to elementary school children, the reviewee is given three points. Thus, a number of points a reviewee is given directly correlates to relevance to the reviewer; and the correlation is positive for matching abstracted profile information, matching poll answers, and matching review ranks. The search can combine a plurality of topics to generate search output (e.g., zip code and household size). The reviewees 174 may then be listed in the order of the most number of points to the least number of points, wherein the points correspond to relevance or best-fit to the reviewer.

Moreover, search for reviewees may be controlled by an administrative console. For example, the administrative console can preset settings to search preschool to reviewers having one or more household members between the ages of three to five years old. Additionally, the administrative console can preset settings to always search certain services that are applicable to a wide range of consumers, such as restaurants, laundry service, house cleaning, and the like.

The suggested reviewees 185 are automatically populated using a suggestion creation method. The technique for suggestion creation method related to search results includes the steps of determining the results of the search; finding the categories of reviewees that matched the original search; then re-searching any reviewees in these categories, and displaying results to the user. For instance, the results of the search may comprise a list of reviewees that provide restaurant services. The suggestion creation method would then look into the category of restaurants and retrieve information relating to reviewees that are relevant to the user's original search and profile. Any duplicates of reviewees that appear more than once under multiple categories are removed. The retrieved information is then displayed in the second section 184 for the user's reference.

FIG. 10 shows an exemplary user interface 800 for providing announcements, poll questions, and general suggestions based on reviewer preferences. In some embodiments, the user interface 800 acts as the home page for reviewers upon logging on. The top portion 192 of the user interface 800 provides a welcome message or greeting with a general notification, such as a number of new, unread messages to the reviewer. The user interface 800 further provides more detailed announcements 193 for updates on reviews or on administrative changes that affect the reviewer.

In the illustrated embodiment, the user interface provides a quick poll 194 for ensuring that reviewer preferences are updated regularly. Generally, the quick poll 194 comprises few questions so that the reviewer can answer them without spending an excessive amount of time. The questions in the quick poll 194 are the questions that may be asked in addition to the initial profile questions to complete the reviewer's account. The answers from the quick poll 194 are stored in the database and used for the suggestion creation method and customized review summary rating method.

While the present invention provides suggestions for reviewees based on the suggestion creation method as described above, it can also populate a list of reviewees 195 based on the user profile information. In this way, the present invention allows reviewers to follow or subscribe to reviewees that are based on their profile.

Example Processes

Figure 13A:
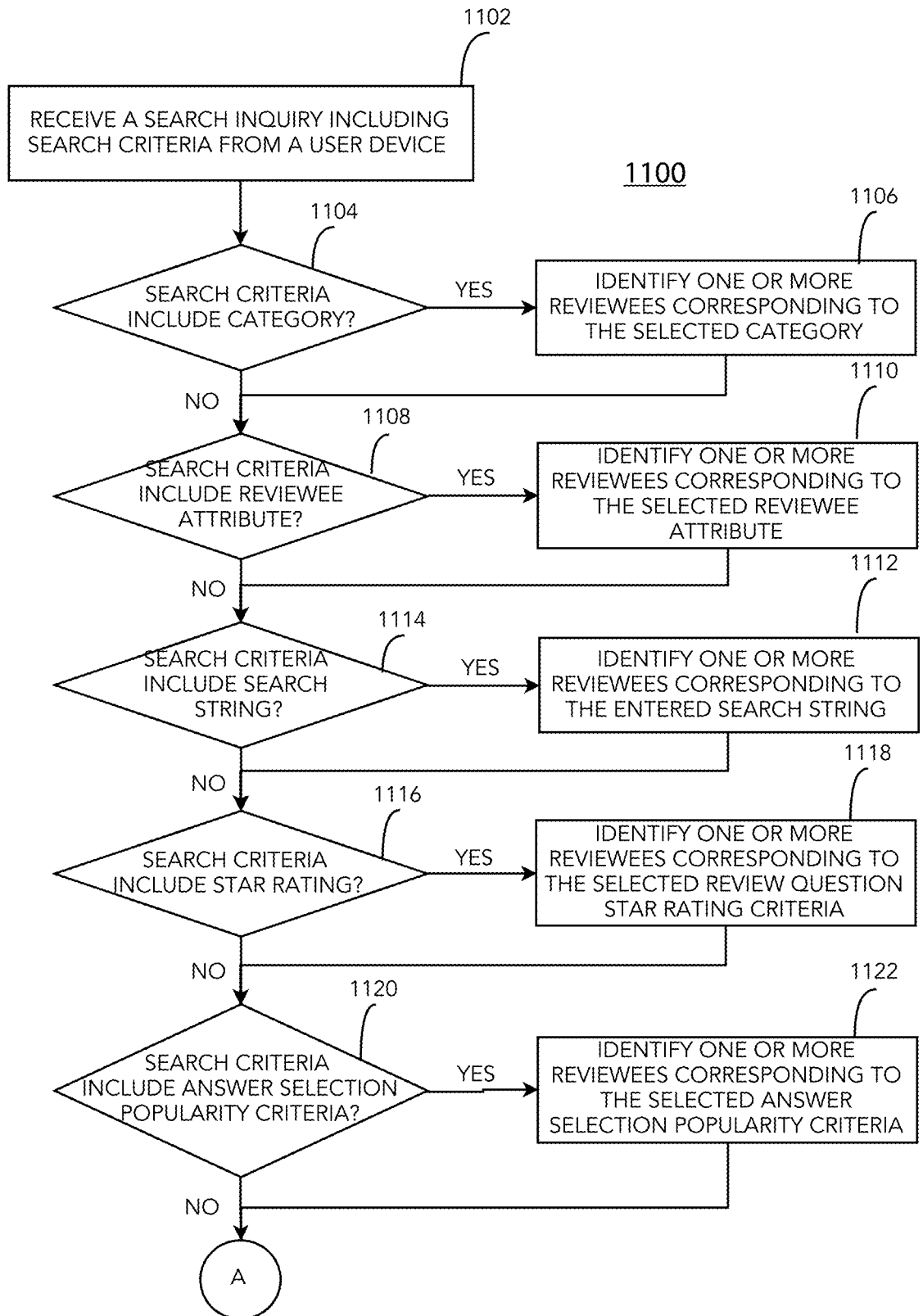
FIGS. 13A and 13B are flow diagrams showing an exemplary workflow for performing search refinement for products and service reviews.
Figure 13B:
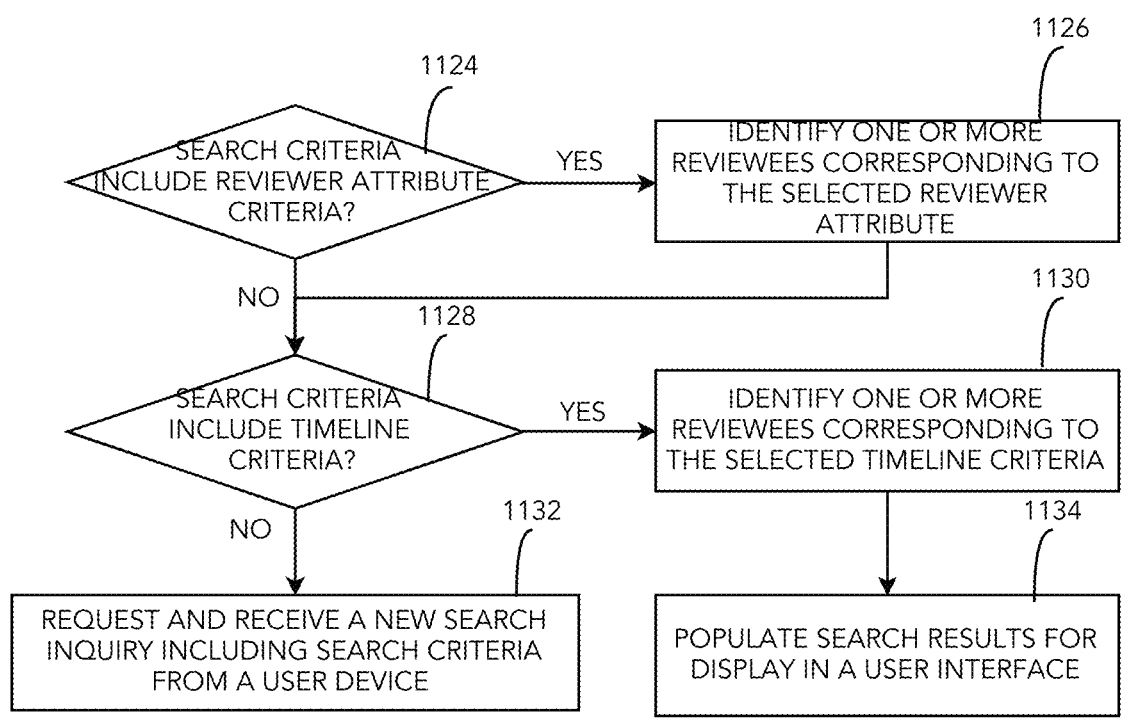
Figure 14:
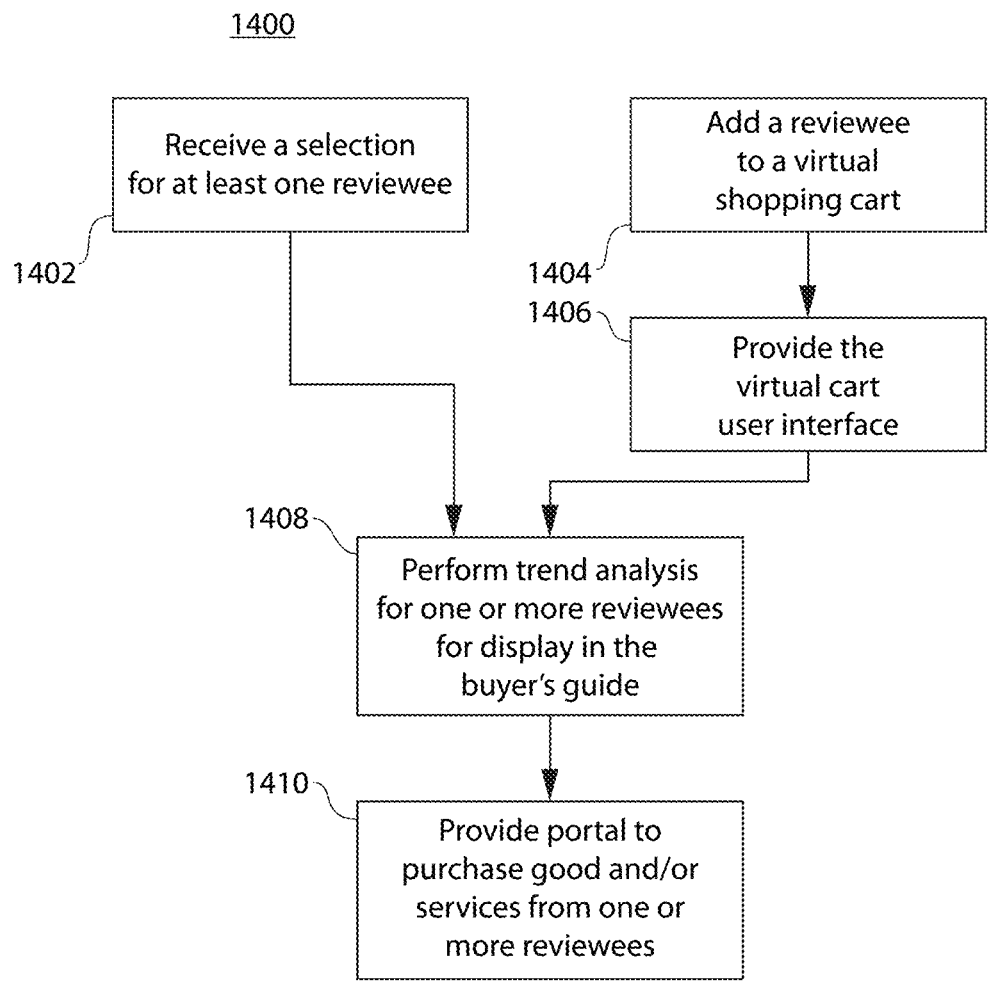
FIG. 14 is a flow diagram showing an exemplary workflow for performing trend analysis.

FIGS. 13A through 14 present illustrative processes 1100, 1400 for performing search refinement for poll based reviews and trend analysis. Each of the processes is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in a mirror to implement the process. For discussion purposes, the processes herein are described with reference to FIGS. 1 through 12.

As indicated in block 1102, one or more computing nodes, via the search module of the application, receive a search inquiry including one or more search criteria from a user via a user device. At decision block 1104, the filter module determines whether the search criteria include one or more categories associated with a reviewee. It is noted that one reviewee can fall under multiple categories. If the search criteria include one or more categories ("yes" response from decision block 1104), the filter module identifies one or more reviewees corresponding to the selected categories in the search inquiry, as indicated in block 1106. If the search criteria do not include a category ("no" response from decision block 1104), the filter module determines whether the search criteria include one or more reviewee attributes at decision block 1108. If the search criteria include one or more reviewee attributes ("yes" response from decision block 1108), the filter module identifies one or more reviewees meeting one or more of the selected reviewee attributes, as indicated in block 1110. Reviewee attributes can comprise categories, subcategories, classification, keywords, and/or so forth.

If the search criteria do not include at least one reviewee attribute ("no" response from decision block 1108), the filter module determines whether the search criteria include one or more search string (e.g., a reviewee's name, specific review answers, keywords, etc.) at decision block 1114. If the search criteria include one or more search string ("yes" response from decision block 1114), the filter module identifies one or more reviewees associated with the entered search string, as indicated in block 1112. If the search criteria do not include a search string ("no" response from decision block 1114), the filter module determines whether the search criteria include any star rating (e.g., four-star reviews and above for overall summary rating, review question star rating, etc.) at decision block 1116. If the search criteria specify any star rating ("yes" response from decision block 1116), the filter module identifies one or more reviewees meeting the star rating, as indicated in block 1118.

If the search criteria do not include any star rating ("no" response from decision block 1116), the filter module determines whether the search criteria include any answer selection popularity criteria at decision block 1120. If the search criteria specify any answer selection popularity criteria ("yes" response from decision block 1120), the filter module identifies reviewees having reviews that meet the selected answer selection popularity criteria, as indicated in block 1122. More specifically, the filter module identifies reviewees from the one or more reviewees that received a specific answer for a particular question more than a predetermined number of times (e.g., more than 50% of the times the question was answered by reviewers). If the search criteria do not include any answer selection popularity criteria ("no" response from decision block 1120), the filter module determines whether the search criteria include any reviewer attribute criteria (e.g., a reviewer's gender, location, marital status, age group, family size, etc.) at decision block 1124. If the search criteria specify reviewer attribute criteria ("yes" response from decision block 1124), the filter module identifies reviewees having reviews from reviewers with the selected reviewer attribute, as indicated in block 1126.

If the search criteria do not include reviewer attribute criteria ("no" response from decision block 1124), the filter module determines whether the search criteria include any timeline criteria at decision block 1128. If the search criteria specify timeline criteria ("yes" response from decision block 1128), the filter module identifies reviewees having reviews that were submitted during the specified timeline, as indicated in block 1130. As indicated in block 1134, the search module populates the search results for display in a user interface. If the search criteria do not include timeline criteria ("no" response from decision block 1128), the filter module requests and receives a new search inquiry including one or more search criteria from the user via the user device, as indicated in block 1132.

Referring now to FIG. 14, there is shown an exemplary flow diagram for conducting trend analysis. At block 1402, the trend analysis module receives a selection for at least one reviewee. Alternatively, the trend analysis module can enable a user to add a reviewee to a virtual shopping cart at block 1404. At block 1406, the application provides the virtual cart user interface. At block 1408, the trend analysis module performs trend analysis for one or more reviewees selected for display in the buyer's guide. In various embodiments, the trend analysis module generates a graph. At block 1410, the buyer's guide can provide a portal to purchase goods and/or services from one or more selected reviewees.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. One or more non-transitory computer-readable media storing computer-executable instructions that upon execution cause one or more processors to perform acts comprising:

storing one or more reviews for each of one or more reviewees, the reviews comprising answers to one or more multiple-choice questions regarding the reviewee or reviewer wherein the multiple-choice questions comprise a plurality of non-numeric answer choices;

for each review, calculating a star rating for each said review question answer based on an answer choice selected therefor;

receiving a search inquiry related to said one or more reviewees, the search inquiry comprising one or more of said answer choices, the search inquiry answer choices utilized to determine one or more minimum rating criteria based on each search inquiry answer choice's associated star rating;

identifying a response set of one or more of said reviewees that are associated with reviews comprising answer choices associated with star ratings exceeding the minimum ranked rating criteria; and transmitting for display via a user interface the response set of one or more reviewees.

2. The one or more non-transitory computer-readable media of claim 1, wherein the acts further comprise:
transmitting a request for a new search inquiry related to the one or more reviewees.

3. The one or more non-transitory computer-readable media of claim 1, wherein the acts further comprise:
performing a trend analysis for one or more reviewees within said response set, the trend analysis indicative of change over time in answer choices associated with at least one reviewee.

4. The one or more non-transitory computer-readable media of claim 1, wherein the user interface comprises a virtual shopping cart.

5. The one or more non-transitory computer-readable media of claim 1, wherein the search inquiry comprises reviewer attributes criteria.

6. The one or more non-transitory computer-readable media of claim 1, wherein the search inquiry comprises one or more reviewee attributes criteria.

7. The one or more non-transitory computer-readable media of claim 1, wherein the search inquiry comprises one or more search string criteria.

8. The one or more non-transitory computer-readable media of claim 1, wherein the search inquiry comprises one or more star rating criteria.

9. The one or more non-transitory computer-readable media of claim 1, wherein the search inquiry comprises one or more answer selection popularity criteria.

10. The one or more non-transitory computer-readable media of claim 1, wherein the search inquiry comprises one or more timeline criteria.

11. A system, comprising:
one or more non-transitory storage medium configured to provide stored code segments, the one or more non-transitory storage mediums coupled to one or more processors, each configured to execute the code segments and causing the one or more processors to:

store one or more reviews for each of one or more reviewees, the reviews comprising answers to one or more multiple-choice questions regarding the reviewee or reviewer wherein the multiple-choice questions comprise a plurality of non-numeric answer choices;

for each review, calculating a star rating for each said review question based on an answer choice selected therefor;

receive a search inquiry related to said one or more reviewees, the search inquiry comprising one or more of said answer choices, the search inquiry answer choices utilized to determine one or more minimum ranked rating criteria based on each search inquiry answer choice's associated star rating;

identify a response set of one or more of said reviewees that are associated with reviews comprising answer choices associated with star ratings exceeding the minimum ranked rating criteria; and transmitting for display via a user interface the response set of one or more reviewees.

12. The system of claim 11, wherein the one or more processor is further configured to:
transmitting a request for a new search inquiry related to the one or more reviewees.

13. The system of claim 11, wherein the one or more processor is further configured to:
perform a trend analysis for one or more reviewees within said response set, the trend analysis indicative of change over time in answer choices associated with at least one reviewee.

14. The system of claim 11, wherein the user interface comprises a virtual shopping cart.

15. The system of claim 11, wherein the search inquiry comprises reviewer attributes criteria.

16. The system of claim 11, wherein the search inquiry comprises one or more reviewee attributes criteria.

17. The system of claim 11, wherein the search inquiry comprises one or more star rating criteria.

18. The system of claim 11, wherein the search inquiry comprises one or more search string criteria.

19. The system of claim 11, wherein the search inquiry comprises one or more answer selection popularity criteria.

20. The system of claim 11, wherein the search inquiry comprises one or more timeline criteria.

* * * * *